C. M. SIMS & H. W. LEE.
COLLAPSIBLE CORE BAR.
APPLICATION FILED MAY 21, 1915.
1,172,316.
Patented Feb. 22, 1916.
3 SHEETS—SHEET 1.
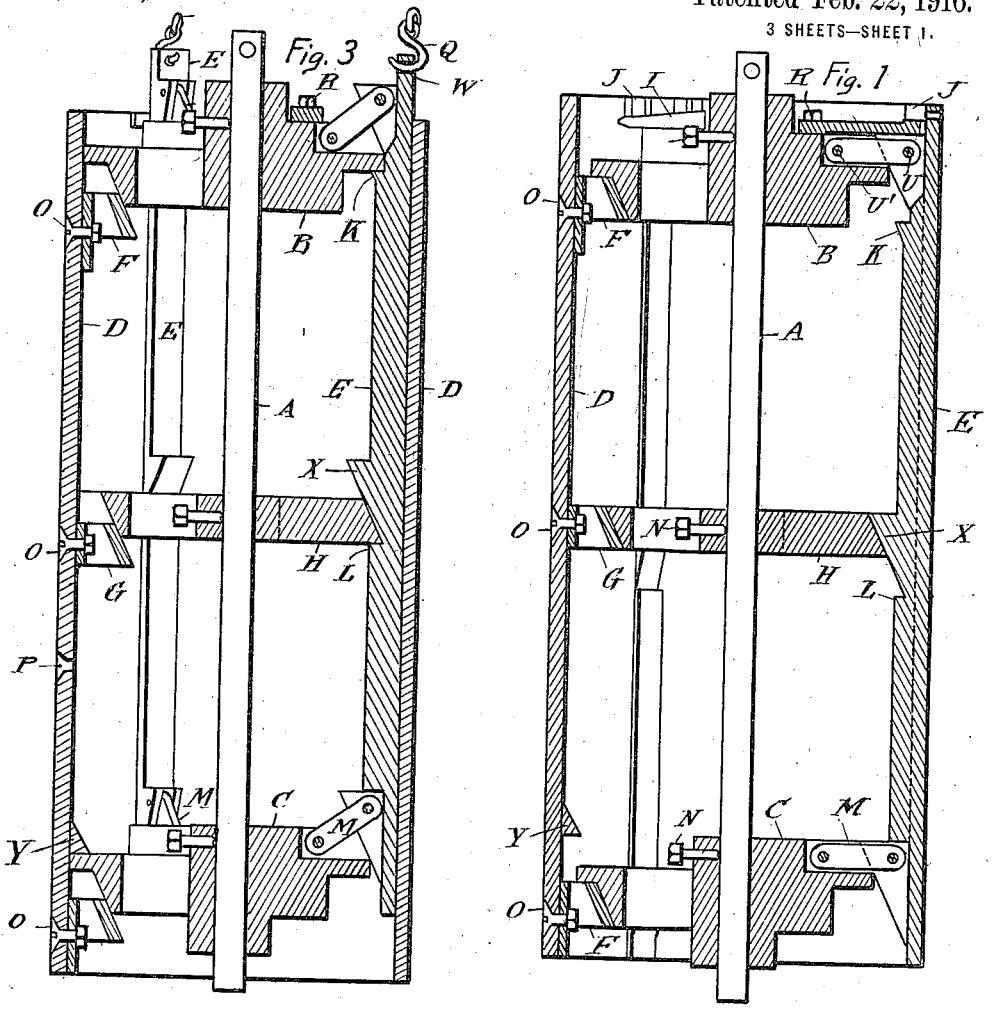
Witnesses
Thomas Jefferson Lee
John Lewis Yancey
Inventors
Charles Milton Sims
Harry Wallace Lee C. M. SIMS & H. W. LEE.
COLLAPSIBLE CORE BAR.
APPLICATION FILED MAY 21, 1915.
1,172,316.
Patented Feb. 22, 1916.
3 SHEETS—SHEET 2.
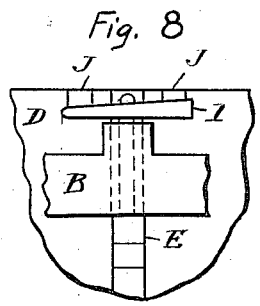
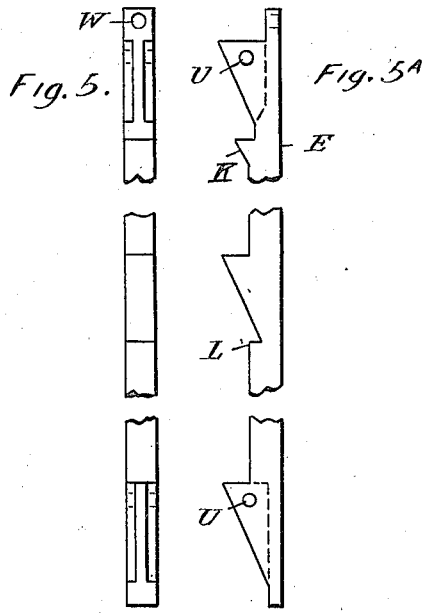
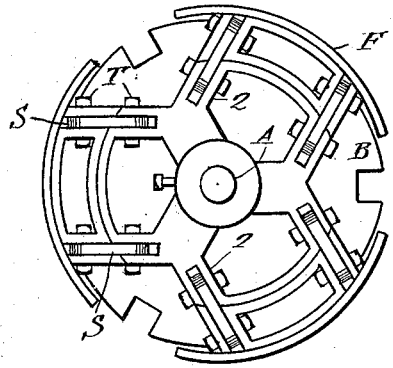
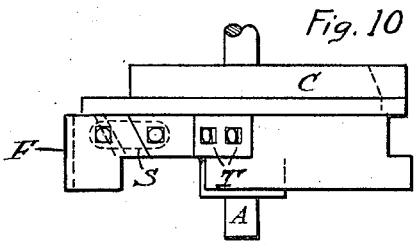
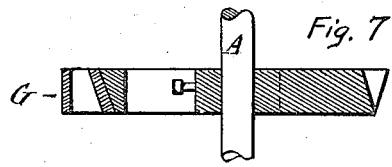
Witnesses
Thomas Jefferson Lee
John Lewis Yancey
Inventors
Charles Milton Sims, Harry Wallace Lee

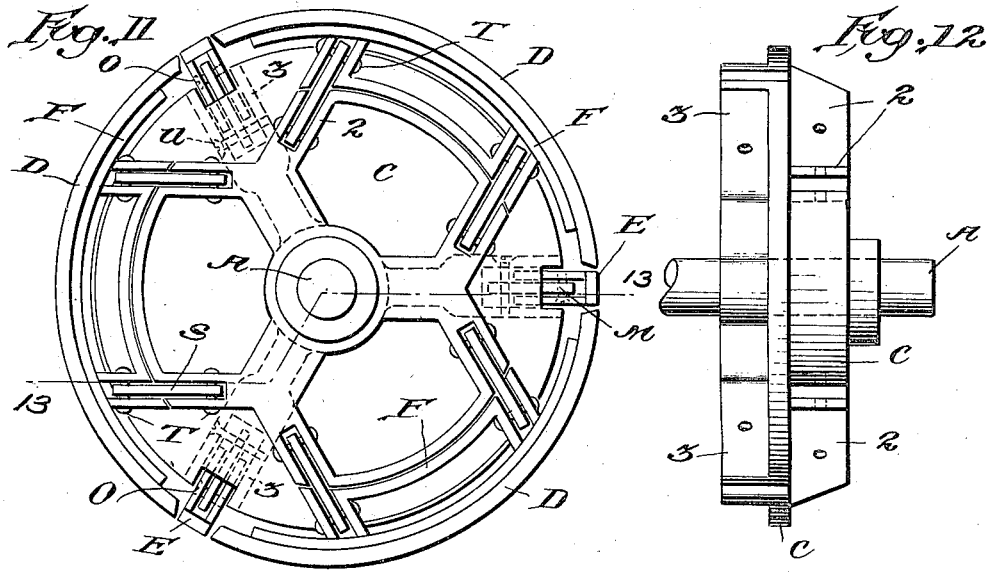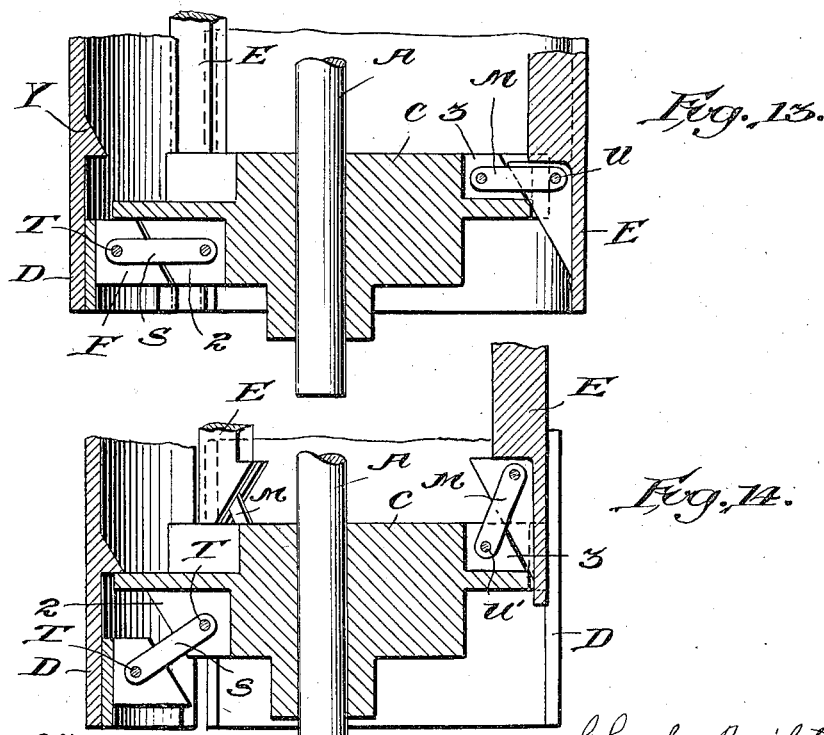

UNITED STATES PATENT OFFICE.

CHARLES MILTON SIMS AND HARRY WALLACE LEE, OF ANNISTON, ALABAMA.

COLLAPSIBLE CORE-BAR.

1,172,316.　　　　　Specification of Letters Patent.　　Patented Feb. 22, 1916.

Application filed May 21, 1915. Serial No. 29,628.

*To all whom it may concern:*

Be it known that we, CHARLES MILTON SIMS and HARRY WALLACE LEE, residing at Anniston, and in the county of Calhoun and State of Alabama, have invented a new and useful Collapsible Core-Bar, of which the following is a specification.

Our invention relates to an improved expansible and collapsible core bar for use in molding operations.

One of the objects of this invention is to provide a simple and rugged core bar which may be easily expanded and then securely locked in this expanded condition, after which it may be easily unlocked and collapsed with a minimum of time and labor.

A further object is to provide a core bar having a central shaft to which a plurality of supporting heads are attached, and two sets of segmental staves, one set of large staves and the other set of small staves, attached to the heads by means of links which have a directed and limited movement so that a pull on the small staves after the locking devices have been released causes these small staves to move longitudinally of the shaft and laterally or substantially radially inward until the movement of this set with respect to the head has been arrested when a further pull on this set of staves moves the shaft and the heads also in the same longitudinal direction and causes the set of large staves to be drawn laterally or substantially radially inward inclosing the small staves. The core bar is then collapsed and its diameter has then been reduced to such an extent that it may be easily removed from the mold.

Other objects and advantages will appear hereinafter, the novel combination of elements being pointed out specifically in the annexed claims.

We attain these objects by a mechanism illustrated in the accompanying drawings in which—

Figure 1 is a vertical cross sectional view of the core bar with its segmental staves held in position by the locking devices ready for the coating of loam to be applied and the bar to be placed into the mold; Fig. 2 is a view looking down at the top end of the core bar when it is in the position as shown in Fig. 1, and showing the segmental staves in the expanded position of the bar so as to present an even outer cylindrical surface and held in place by the locking devices, also showing in a broken away portion the links connecting the large staves to the lower surface of the head; Fig. 3 is a vertical cross section view of the core bar with the parts in the position they assume when the core bar is being withdrawn from the mold. The locking devices have been disengaged from the staves and the smaller staves have been moved upward and at the same time drawn inwardly by the links connecting the staves to the supporting heads until the lugs on these staves have engaged surfaces on the supporting heads and the larger staves have been permitted to move inwardly and axially in the other direction until lugs on these large staves engage surfaces on the supporting heads, thus causing the large staves to inclose the small staves. The core bar is then completely collapsed and may be withdrawn from the mold. Fig. 4 is a view similar to Fig. 2, but the core bar is in its collapsed condition, as in Fig. 3. The view is looking directly at the top end, or head, of the bar; Fig. 5 is a front view of one of the small staves which are part of the cylindrical surface of the core bar when the core bar is in the expanded condition and Fig. 5ᴬ is a side view of the same small stave; Figs. 6 and 7 show respectively the plan and cross sectional views of the middle head and the seats which are attached to the large staves (not shown). These seats have inclined surfaces which are in engagement with inclined surfaces in the middle head, as shown in Fig. 7. Fig. 8 is a detail of one of the locking devices which hold the component staves of the core bar in the expanded condition; Fig. 9 shows a plan view of the lower head from underneath showing the links which connect the large staves to the head, but with the large staves, and the small staves with their connecting links omitted for the sake of clearness; and Fig. 10 is a side view of the lower head as shown in Fig. 9; Fig. 11 is a plan view of the lower supporting head from underneath with the small staves and the large staves in their relative positions when the core bar is in the expanded position, and showing the links which connect both sets of staves to this head in their relative positions; Fig. 12 is a side view of the lower head with the staves, and all the parts which connect the staves to the head removed for the sake of clearness; Fig. 13 is a cross sectional view of the lower part of the core bar taken on the line 13—13 of Fig. 11, showing more particularly the lower head and the relative positions the links and other parts assume when the core bar is in the expanded condition; Fig. 14 is a similar view to Fig. 13 with the exception that the core bar is in the collapsed condition, the small staves having been drawn upwardly and by means of the links which connect them with the head, drawn inwardly, and the large staves have been drawn inwardly by the links which connect them with the head due to the upward movement of the head which has been caused by the upward movement of the small staves. The view shows the small staves inclosed by the large staves.

Similar letters refer to similar parts throughout the several views.

It should be stated here that the six component parts of the cylindrical shell, three of which are wide and three of which are narrow, are referred to hereafter as the "large" and the "small" staves.

The constituent parts of the core bar are built around and on the solid iron or steel shaft A as shown in the various figures. Near the top of this shaft there is attached a head B which is cast iron, by means of the set screw N shown in Fig. 1. At the opposite end the cast iron head C is attached by the set screw N.

H is a cast iron seat for the staves attached to the shaft A by a set screw N.

The segmental staves which together form a cylinder when the core bar is expanded are attached to the heads B and C. This cylinder is composed of six separate and distinct staves, three of which are comparatively narrow, as shown by E, and three of which are comparatively broad, as shown by D. Their relative widths are illustrated in E and D in Fig. 2. The staves E and D are concave, and when attached to the heads B and C they form a substantially perfect unbroken cylinder about the shaft A. Each small stave is fastened to the upper surface of the heads B and C by means of two links M, one for each head, and each of the larger staves is fastened to the lower surface of these heads by means of four links S, one for each head, as shown in Figs. 1, 2, 3, 4, 9 and 11. The links M are fastened to the heads by the bolts U', and to the staves by the rivet U, and the links S are fastened to the heads and the large staves by means of the bolts T. To facilitate the movement of the small staves E in sliding upward, the links M may be placed at a 7 degree forward angle. The bar, however, is operable when the link M lies at a right angle with the shaft A as shown in Fig. 1. The heads B and C, the links connecting the staves to the heads, and the seat H are so constructed, as shown in the drawings, that the longitudinal movement of the small staves E with respect to the heads is in the opposite axial direction from the relative longitudinal movement of the large staves D with respect to the heads when the core bar is being expanded or collapsed.

The bar is shown expanded in Fig. 1. The three larger staves D have been pushed longitudinally upward until their links, which cannot be seen in Fig. 2, have become perpendicular to the shaft A and at the same time have moved the staves laterally or substantially radially away from the axis of the bar. When this is done the seats F at both ends of the staves, and the center seat G at the center come in contact with the heads B and C and the center seat H as shown in Fig. 1, and prevent any other further upward motion. The seats F and G are fastened to the staves by the bolts O. The small staves E, which have beveled surfaces, fall into their positions between the larger staves as shown in Figs. 1, 2, 11 and 13, of their own weight and are stopped at the proper distance when the links M are perpendicular to the shaft A by the seats X resting on the seat H, and the links coming in contact with the heads B and C as shown in Figs. 1 and 13.

The staves when placed in position as just described and as shown in the Figs. 1 and 13, are held in position by the independent locking devices shown in Figs. 1, 2 and 8. These locking devices consist of three iron wedges I fastened, as shown in Fig. 2, at one end to the head B by the bolts R. When the large staves D have been pulled or pushed upward until they have reached the positions shown in Figs. 1 and 8, the wedges I are knocked under the lugs J, which are formed on the large staves, and these staves are thus held in position until the locking devices are disengaged from the lugs. It will be noticed that the locking devices not only engage the lugs J on the large staves, and thus prevent these staves from moving downward, but the small staves are at the same time prevented from being moved upward because the locking devices have covered the links M connecting the small staves to the head B. A further advantage of these independent locking devices is that any inequalities in construction and wear of the large staves may be compensated for by the wedge action of each locking device acting independently of the other locking devices, making it possible to at all times lock the staves securely in the expanded position and prevent any relative movement of the staves while the mold is being formed.

When the core bar is in the expanded condition as shown in Figs. 1, 2, 11 and 13, the locking devices I are knocked out from under the lugs J and the links M, connecting the small staves to the head, uncovered, the small staves are pulled upward by means of a chain having hooks Q which are inserted in suitable holes in the upper ends of the small staves. The links M which connect the small staves to the heads B and C cause these staves to move radially inward toward the shaft, as shown in Figs. 3 and 14, when these small staves are moved upwardly. The upward longitudinal movement of these staves is arrested by the shoulders K and L coming in contact with the head B and the seat H. When K and L reach the positions shown in Fig. 3, the whole bar is lifted if the upward force on the ends of the smaller staves is continued. When these small staves E, which are beveled to hold the large staves in a rigid position, as shown in Fig. 2, are withdrawn from their place between the larger staves D and the shoulders K and L have contacted with the heads B and H moving all the heads and the shaft upward with the small staves, the larger staves because of their weight, and also because of the friction between these large staves and the mold in the upward movement of the whole bar, are moved laterally or substantially radially inward by means of the links S connecting the large staves with the heads B and C. The relative movement between the large staves and the heads is in the opposite axial or longitudinal direction from the relative movement between the small staves and the heads when the core bar is being collapsed but the lateral or radial movement of the two sets of staves with respect to the shaft is in the same direction. This is likewise the case when the core bar is being expanded. The large staves are stopped and held firm at the proper place by the lugs Y coming in contact with the head C as shown in Figs. 3 and 14. The small staves E have been moved upwardly and at the same time been moved toward the shaft by the action of the links M and a relative movement of the large staves D in the opposite axial direction with respect to the heads has been caused, the large staves at the same time caused to move toward the shaft by means of the links S, as shown in Fig. 14. The large staves thus inclose the small staves and the diameter of the bar is materially reduced. The upward lifting force is continued, and the whole bar, after first automatically collapsing and reducing the diameter at every point (as in Figs. 3 and 14) is lifted from the mold.

An end view of this bar when collapsed is shown in Fig. 4. This view shows how the narrow staves slip up and the larger ones come together over them. The links M are also very well shown in this drawing. In Figs. 5 and 5ª one of the narrow staves is shown in detail. The links are attached to the projecting wings at U. K and L are the shoulders which hold the staves in place, and remove the strain from the links when the staves have reached their desired positions. The chain which lifts the core bar is fastened to the narrow staves at W. One of the locking devices is shown in Fig. 8. The wedge I which revolves on a bolt R (see Figs. 2 and 4) is thicker on the right side, so that it may be driven under the lugs J until the staves are well secured. They can be released by one blow of the hammer, and may be made of iron or steel as usage proves the most desirable.

The middle head or seat, a plan of which is shown in Figs. 6 and 7 may or may not be used, as experience shall prove the best. Its function is to strengthen the bar and to bear a portion of the lateral pressure upon the bar while surrounded by the metal in the mold. A view of the bottom head from the under side is shown in Fig. 9 and a side view of the same is shown in Fig. 10. This very clearly shows the links attached to the larger staves. The links are marked S and are likewise shown in Figs. 2, 11, 13 and 14. The connection of the large staves to the under surface of head B by means of the links S is the same as the connection of these staves to the lower head C, as shown in Figs. 2, 11, 13 and 14. The links S are connected to the heads by means of bolts T retained in holes in the supporting flanges 2, as shown in Figs. 2, 11, 12, 13 and 14, and the links M are connected to the heads by means of bolts U' retained in holes in the supporting flanges 3 as shown in Figs. 11, 12, 13 and 14.

The core bar may be made in whole or in part of iron or steel, or partly of both. Those portions which have to bear the greatest strain may be made of steel in order to secure the greatest durability. The bar shown in the drawings has six staves. This collapsible core bar is prepared for the mold in the same manner as the present non-collapsible core bars now are, except that no hay rope and only one coating of loam or mud is used. Before being placed in the core lathe, the bar is set as shown in Fig. 1, and securely fastened by the locking device. One coating of loam is then applied, and the usual wash is put on and the core is ready to be picked up and put into the mold by the crane. It is carried by placing the crane hook in the hole at the end of the shaft.

After placing the core bar in the mold, the pipe is poured as usual, and the bar is lifted by pulling with the crane on the three chains that are connected with the smaller staves, after the locking device has been knocked loose by the use of hammers. The bar may be rested on a stool having a hole for the lower end of the shaft A, and when rested on this stool it will immediately resume its expanded position, the staves sliding outwardly to their places by their own weight. The locks may then be set, and the core bar is ready for the core lathe again.

Having thus fully described our invention, what we claim as new and desire to secure by Letters Patent, is:—

1. A collapsible core bar comprising two sets of staves, means connecting the sets of staves operating to produce a longitudinal movement of the one set of staves in one direction when the other set of staves is moved in the opposite longitudinal direction.

2. A collapsible core bar comprising a supporting head, a set of staves connected to the head, each stave of which is adapted to be moved longitudinally and laterally with respect to the head until the head is engaged when a further longitudinal movement of the staves moves the head in the same longitudinal direction, and a second set of staves connected to the head, each stave of which is moved laterally of the head by the longitudinal movement of the head.

3. A collapsible core bar comprising two sets of staves, means connecting the two sets of staves causing the one set to inclose the other set when the other set is moved in the direction of the axis of the bar.

4. In a collapsible core bar in combination, a shaft, two sets of staves, means connecting the first set of staves to the shaft for moving this set toward the shaft and axially of the shaft, means connecting the second set of staves to the shaft for causing this second set to inclose the first set when the first set is moved in the aforesaid axial direction after the movement of the first set toward the shaft has been arrested.

5. In a collapsible core bar in combination, a shaft, two sets of staves, means connecting the first set of staves to the shaft for moving this set toward the shaft, means for arresting the movement of this first set of staves toward the shaft, means connecting the second set of staves to the shaft for causing this second set of staves to inclose the first set when the first set is moved in the direction of the axis of the shaft after the movement of the first set toward the shaft has been arrested.

6. In a collapsible core bar in combination, a shaft, two sets of staves, means connecting the first set of staves to the shaft for moving this set toward the shaft by a movement of the staves of this set in a direction along the axis of the shaft, means for arresting the movement of this set toward the shaft, means connecting the second set of staves to the shaft for inclosing the first set of staves by the second set of staves when the first set of staves is moved farther in the same axial direction after the movement of the first set of staves toward the shaft has been arrested.

7. In a collapsible core bar in combination, a supporting head, two sets of staves connected to the head, means connecting the first set of staves to the head for moving this set toward the head until the head is engaged when a longitudinal movement of this set of staves moves the head in the same longitudinal direction causing a relative longitudinal movement of the second set of staves in the opposite direction.

8. In a collapsible core bar in combination, a supporting head, two sets of staves, means connecting the first set of staves to the head for moving the staves of this set toward the head until the head is engaged, means for arresting the movement of the staves of this set, means connecting the second set of staves to the head for causing a relative movement in one longitudinal direction between this set of staves and the head when the first set of staves is moved in the opposite longitudinal direction after the movement of the first set of staves toward the head has been arrested.

9. A collapsible core bar comprising a supporting head, two sets of staves, means connecting the first set of staves to the head adapted to move this set radially inward and axially in one direction with respect to the head, means connecting the second set of staves to the head for moving this set radially inward and in the opposite axial direction from the first set of staves causing the second set of staves to inclose the first set when the core bar has been collapsed.

10. A collapsible core bar comprising a central shaft, a plurality of supporting heads attached to the shaft, a plurality of small staves, a plurality of large staves, links connecting the small staves to the heads adapted to move these staves radially of the shaft and axially of the shaft in one direction, links connecting the large staves to the heads for moving these staves radially in the same direction as the small staves and axially in the opposite direction, means carried by the large staves for limiting their movement, lugs on the large staves and locking devices connected to one of the heads engaging the lugs for locking the core bar in the expanded position.

11. A collapsible core bar comprising a shaft, a plurality of supporting heads fastened to the shaft, two sets of staves, links connecting the first set of staves to the upper surfaces of the heads for moving these staves radially with respect to the shaft, links connecting the second set of staves to the lower surfaces of the heads for moving these staves in the same radial direction as the first set of staves, and means carried by the staves and contacting with the heads for limiting the movement of the staves.

12. A collapsible core bar comprising a plurality of staves, a supporting head, links connecting the staves with the head, lugs on the staves and a plurality of independent locking devices engaging the lugs.

13. A collapsible core bar comprising a supporting head, a plurality of sets of staves, links connecting one set of staves to one surface of the head, links connecting another set of staves to the opposite surface of the head, and means for limiting the movement of the links.

14. A collapsible core bar comprising a plurality of staves, a supporting head, means connecting the staves with the head, surfaces on the staves engaging surfaces on the head for directing and limiting the movement of the staves, and a plurality of independent locking devices mounted on the head engaging the staves.

15. A collapsible core bar comprising a supporting head, two sets of staves, links connecting one set of staves to one surface of the head, links connecting the other set of staves to the opposite surface of the head, lugs on the latter set of staves, and a locking device fastened to the head engaging the lugs.

16. A collapsible core bar comprising a plurality of staves, a supporting head, means connecting the staves to the head, lugs on the staves, and a plurality of independent locking devices fastened to the head engaging the lugs.

17. A collapsible core bar comprising a supporting head, two sets of staves, links connecting one set of staves to the head, lugs on the other set of staves, and a locking device fastened to the head for engaging the lugs and covering the links.

18. A collapsible core bar comprising a supporting head, two sets of staves, links connecting the staves to the head, means carried by the staves and contacting with the head for limiting the movement of the staves, lugs on one set of staves, and a locking device fastened to the head engaging the lugs and covering the links connecting the other set of staves to the head.

CHARLES MILTON SIMS.
HARRY WALLACE LEE.

Witnesses:
THOMAS JEFFERSON LEE,
JOHN LEWIS YANCEY.

Copies of this patent may be obtained for five cents each, by addressing the "Commissioner of Patents, Washington, D. C."